(12) United States Patent
Takahashi et al.

(10) Patent No.: US 7,923,514 B2
(45) Date of Patent: Apr. 12, 2011

(54) METHOD OF HYDROGENATING CONJUGATED DIENE POLYMER, HYDROGENATION CATALYST SYSTEM, AND COMPOSITION OF BASIC, CONJUGATED DIENE POLYMER

(75) Inventors: Kazuhiro Takahashi, Tokyo (JP); Takafumi Kawanaka, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 11/962,972

(22) Filed: Dec. 21, 2007

(65) Prior Publication Data

US 2008/0132649 A1 Jun. 5, 2008

Related U.S. Application Data

(62) Division of application No. 10/490,057, filed as application No. PCT/JP02/09707 on Sep. 20, 2002, now abandoned.

(30) Foreign Application Priority Data

Sep. 21, 2001 (JP) .................. 2001-287984
Mar. 22, 2002 (JP) .................. 2002-080682

(51) Int. Cl.
*C08F 8/04* (2006.01)
*C08F 236/12* (2006.01)
*C08C 19/02* (2006.01)
*C08C 1/02* (2006.01)

(52) U.S. Cl. .................. 525/329.3; 525/338; 525/339; 525/331.9

(58) Field of Classification Search .............. 525/329.3, 525/331.9, 338, 339
See application file for complete search history.

(56) References Cited

U.S. PATENT DOCUMENTS

| | | | |
|---|---|---|---|
| 2,063,158 A | 12/1936 | Greenwalt | |
| 2,905,658 A | 9/1959 | Dietz | |
| 4,452,951 A * | 6/1984 | Kubo et al. | 525/339 |
| 4,501,685 A | 2/1985 | Thomson et al. | |
| 4,560,817 A * | 12/1985 | Bobsein et al. | 585/273 |
| 4,906,790 A | 3/1990 | Ishiguro et al. | |
| 5,075,388 A * | 12/1991 | Rempel et al. | 525/338 |
| 6,309,758 B1 | 10/2001 | Schmidt | |
| 6,403,727 B1 * | 6/2002 | Leube et al. | 525/338 |
| 7,265,184 B2 | 9/2007 | Dath et al. | |

FOREIGN PATENT DOCUMENTS

| | | |
|---|---|---|
| DE | 32 27 650 A | 3/1983 |
| JP | 9-268209 A | 10/1997 |
| JP | 2000-95815 * | 4/2000 |
| WO | WO 99/28357 * | 6/1999 |
| WO | WO-99/64479 A1 | 12/1999 |
| WO | WO-00/68278 A2 | 11/2000 |
| WO | WO-01/32719 A2 | 5/2001 |
| WO | WO-03/008467 A1 | 1/2003 |

OTHER PUBLICATIONS

"Platinum Group," Wikipedia, 2007, http://en.wikipedia.org/wiki/Platinum_group.

* cited by examiner

*Primary Examiner* — Roberto Rabago
(74) *Attorney, Agent, or Firm* — Birch, Stewart, Kolasch & Birch, LLP

(57) ABSTRACT

A process for hydrogenating a conjugated diene polymer wherein a conjugated diene polymer is hydrogenated in the presence of a catalyst comprising a platinum group metal or its compound, and a basic compound. More specifically, (1) hydrogenation is conducted in a reaction system prepared by incorporating the catalyst and the basic compound in a solution or latex of the conjugated diene polymer; (2) hydrogenation is conducted in a reaction system prepared by incorporating a catalyst system comprising a combination of the catalyst with the basic compound, in a solution or latex of the conjugated diene polymer; or (3) hydrogenation is conducted in a reaction system prepared by incorporating the catalyst in a solution of a composition comprising the conjugated diene polymer and the basic compound. Thus, a hydrogenated conjugated diene polymer can be efficiently and industrially advantageously produced using a small amount of a catalyst.

7 Claims, No Drawings

METHOD OF HYDROGENATING CONJUGATED DIENE POLYMER, HYDROGENATION CATALYST SYSTEM, AND COMPOSITION OF BASIC, CONJUGATED DIENE POLYMER

CROSS-REFERENCE TO RELATED APPLICATIONS

The present application is a 37 C.F.R. § 1.53(b) divisional of U.S. application Ser. No. 10/490,057 filed Mar. 19, 2004, now abandoned, which in turn claims priority of International Application No. PCT/JP02/09707 filed Sep. 20, 2002; Japanese Patent Application No. 2001-287984 filed Sep. 21, 2001; and Japanese Patent Application No. 2002-080682 filed Mar. 22, 2002. The entire contents of each of these applications are hereby incorporated by reference.

TECHNICAL FIELD

This invention relates to a process for hydrogenating a conjugated diene polymer, a hydrogenation catalyst system used for hydrogenation of a conjugated diene polymer, and a basic conjugated diene polymer composition.

BACKGROUND ART

Processes for hydrogenating carbon-carbon double bonds of a conjugated diene polymer to produce a highly saturated polymer are known. Various homogeneous catalysts and heterogeneous catalysts have been proposed for use in these hydrogenation processes (for example, see Japanese Unexamined Patent Publication [hereinafter abbreviated to "JP-A"] No. S58-17103, JP-A S59-117501, JP-A S61-247706 and JP-A S62-42937).

Of these hydrogenation catalysts, those which contain a platinum group metal represented by palladium or rhodium are popularly used because they exhibit a high activity for hydrogenation of carbon-carbon double bonds of a polymer chain and the hydrogenation can be achieved with a high hydrogenation percentage and a high selectivity. For example, a catalyst comprised of palladium or rhodium supported on a carrier is used in an industrial scale for hydrogenation of an acrylonitrile-butadiene copolymer, which is one kind of the conjugated diene polymer.

However, production of platinum group metals such as palladium and rhodium is limited, and these metals are scarce and expensive. Therefore, it is eagerly desired to reduce the amount of the platinum group metals used, namely, to more enhance the catalytic activity from a viewpoint of cost reduction and conservation of natural resources. More specifically it is requested for enhancing the efficiency in the above-mentioned hydrogenation of an acrylonitrile-butadiene copolymer in an industrial scale.

Various methods have been proposed for the preparation of the platinum group metal catalysts. For example, in the case of a supported palladium catalyst, a process is generally adopted wherein a palladium compound capable of being converted to metallic palladium is dissolved in an appropriate solvent such as water or acetone; the thus-obtained solution is sprayed onto an appropriately selected carrier or the carrier is dipped in the solution, and then the carrier is dried; the palladium compound supported on the dried carrier is converted to oxide or hydroxide by a treatment with an aqueous solution of sodium hydroxide or sodium metasilicate, and finally the oxide or hydroxide is treated with a reducing agent such as hydrazine or hydrogen to be thereby reduced into metallic palladium. Alternatively, the palladium compound supported on the dried carrier is treated with the reducing agent without the pre-treatment for conversion to oxide or hydroxide.

As mentioned above, most conventional processes for the preparation of a supported platinum group metal catalyst comprise many complicated steps such as dissolution of a raw material for the catalyst, application of the solution on a carrier by spraying or dipping, drying or burning of the solution-applied carrier, and reduction of oxide or hydroxide with a reducing agent. A problem arises in that activity and service life of the prepared catalyst vary depending upon the particular conditions adopted for the preparation of catalyst.

To enhance the efficiency of hydrogenation, a method using a homogeneous palladium catalyst and a method reducing a palladium compound in a hydrogenation reaction system have been examined. For example, a hydrogenation process using a palladium salt of a carboxylic acid as a catalyst has been proposed in JP-A S59-117501 wherein the catalyst is reduced with hydrogen in a solution of a conjugated diene polymer and subsequently hydrogenation is carried out. A catalyst system for hydrogenation of a conjugated diene polymer, a process for preparing the catalyst system, and a process for hydrogenating the conjugated diene polymer have been proposed in JP-A H6-298844, which catalyst system comprises a polymer complex comprised of a hydrogenation catalyst such as a palladium compound and a specific polymer such as, for example, a nitrile group-containing polymer. Homogeneous palladium catalysts proposed in the patent publications have a problem in that a step of recovering the catalyst after completion of the hydrogenation is complicated.

A process for hydrogenating an acrylonitrile-butadiene copolymer has been proposed in JP-A H2-196803 wherein the copolymer is hydrogenated in a solvent in the presence of a catalyst system prepared by reacting a hydrogenation catalyst such as a palladium catalyst with one or more specific metal compounds such as, for example, an aluminum compound. However, this composite metal type catalyst system does not exhibit sufficiently high activity for hydrogenation.

DISCLOSURE OF THE INVENTION

In view of the foregoing state of prior art and the problems involved therein, an object of the present invention is to provide a process for hydrogenating a conjugated diene polymer wherein the hydrogenation is effected with an enhanced efficiency and industrially advantageously with a reduced amount of a platinum group metal catalyst.

Another object of the present invention is to provide a catalyst system used for hydrogenation of a conjugated diene polymer, which can be easily prepared and has a markedly enhanced activity for hydrogenation as compared with hitherto proposed hydrogenation catalysts.

A further object of the present invention is to provide a conjugated diene polymer from which an objective hydrogenated polymer can be produced with a high efficiency at an enhanced rate of hydrogenation reaction.

To achieve the above-mentioned objects, the present inventors made extensive researches on relationship of hydrogenation reaction conditions with catalytic activity, and further relationships of the procedures and conditions for preparing a hydrogenation catalyst and the procedures using the catalyst, with catalytic activity, in a process for hydrogenating a conjugated diene polymer using a catalyst comprising a platinum group metal or its compound. As the result, it was found that, in the case when the catalytic hydrogenation reaction is carried out in the presence of a basic compound, the hydrogenation reaction proceeds rapidly with a high selectivity, and further that a catalyst system comprising a combination of a platinum group metal or its compound as a catalyst with a basic compound exhibits a high catalytic activity for hydrogenation reaction, especially, a catalyst system comprising a combination of a platinum group metal compound as a catalyst with a basic compound exhibits a high catalytic activity for hydrogenation reaction even when the catalyst system is used without pre-reduction treatment for hydrogenation of a conjugated diene polymer. Further it was found that the hydrogenation reaction proceeds more rapidly and an objective hydrogenated polymer is produced with a very high efficiency in the case when a conjugated diene polymer composition prepared by contacting a crumb obtained by coagulating a conjugated diene polymer as produced in a polymerization step with an aqueous solution of a basic compound is used.

Thus, in one aspect of the present invention, there is provided a process for hydrogenating a conjugated diene polymer characterized in that a conjugated diene polymer is hydrogenated in the presence of a catalyst comprising a platinum group metal or its compound, and a basic compound.

The above-mentioned hydrogenation process can be carried out preferably by (i) a procedure wherein a conjugated diene polymer is hydrogenated in a reaction system prepared by incorporating the catalyst and the basic compound, in a solution or latex of the conjugated diene polymer; (ii) a procedure wherein a conjugated diene polymer is hydrogenated in a reaction system prepared by incorporating a catalyst system comprising a combination of the catalyst with the basic compound, in a solution or latex of the conjugated diene polymer; or (iii) a procedure wherein a conjugated diene polymer is hydrogenated in a reaction system prepared by incorporating the catalyst in a solution of a composition comprising the conjugated diene polymer and the basic compound.

In another aspect of the present invention, there is provided a catalyst system for hydrogenation of a conjugated diene polymer comprising a combination of a platinum group metal or its compound with a basic compound, which is used preferably in the above-mentioned procedure (ii).

In a further aspect of the present invention, there is provided a conjugated diene polymer composition comprising a conjugated diene polymer and a basic compound, characterized in that a solution of the composition in tetrahydrofuran has a pH value of larger than 7.0, which is used preferably in the above-mentioned procedure (iii).

BEST MODE FOR CARRYING OUT THE INVENTION

The process for hydrogenating a conjugated diene polymer, the hydrogenation catalyst and the conjugated diene polymer composition according to the present invention will be described in detail.

Conjugated Diene Polymer

The conjugated diene polymer to be hydrogenated by the process of the present invention is a polymer comprising conjugated diene monomer units as structural units, and includes a homopolymer and copolymers of a conjugated diene monomer, and natural rubber. The conjugated diene polymer generally comprises 10 to 100% by weight, preferably 10 to 90% by weight, of conjugated diene monomer units and 90 to 0% by weight, preferably 90 to 10% by weight, of units of other copolymerizable monomer.

The conjugated diene monomer is not particularly limited, and, as specific examples thereof, there can be mentioned 1,3-butadiene, 2-methyl-1,3-butadiene (i.e., isoprene), 2,3-dimethyl-1,3-butadiene, 2-chloro-1,3-butadiene and 1,3-pentadiene. Of these, 1,3-butadiene and 2-methyl-1,3-butadiene are preferable. 1,3-butadiene is especially preferable. These conjugated diene monomers may be used either alone or as a combination of at least two thereof.

The monomer copolymerizable with the conjugated diene monomer also is not particularly limited, and, as specific examples thereof, there can be mentioned $\alpha,\beta$-ethylenically unsaturated nitriles such as acrylonitrile, methacrylonitrile, crotononitrile and vinylidene cyanide; $\alpha,\beta$-ethylenically unsaturated carboxylic acids such as acrylic acid, methacrylic acid, crotonic acid, fumaric acid, maleic acid and itaconic acid; $\alpha,\beta$-ethylenically unsaturated carboxylic acid esters such as methyl acrylate, n-butyl acrylate, 2-ethylhexyl acrylate, trifluoroethyl acrylate, methyl methacrylate and methyl crotonate; $\alpha,\beta$-ethylenically unsaturated carboxylic acid amides such as acrylamide and methacrylamide; vinyl aromatic compounds such as styrene, $\alpha$-methylstyrene, divinylbenzene and vinylpyridine; vinyl alcohol precursor esters such as vinyl acetate and vinyl propionate; and vinyl ether compounds such as fluoroethyl vinyl ether.

Of these, $\alpha,\beta$-ethylenically unsaturated nitriles, $\alpha,\beta$-ethylenically unsaturated carboxylic acids and $\alpha,\beta$-ethylenically unsaturated carboxylic acid esters are preferable. $\alpha,\beta$-ethylenically unsaturated nitriles are especially preferable. These monomers copolymerizable with the conjugated diene monomer may be used either alone or as a combination of at least two thereof.

As specific examples of the conjugated diene polymer used in the present invention, there can be mentioned polybutadiene, polyisoprene, a butadiene-acrylonitrile copolymer, a butadiene-methacrylonitrile copolymer, an isoprene-acrylonitrile copolymer, an isoprene-methacrylonitrile copolymer, an isoprene-butadiene-acrylonitrile copolymer, an isoprene-butadiene-methacrylonitrile copolymer, a butadiene-methyl acrylate-acrylonitrile copolymer, a butadiene-acrylic acid-acrylonitrile copolymer, a butadiene-styrene copolymer and an isoprene-styrene copolymer.

Of these, conjugated diene-$\alpha,\beta$-ethylenically unsaturated nitrile copolymers represented by a butadiene-acrylonitrile copolymer, a butadiene-methacrylonitrile copolymer, an isoprene-acrylonitrile copolymer and an isoprene-butadiene-acrylonitrile copolymer are preferable.

The conjugated diene polymer further includes natural rubber as a preferable polymer, in addition to the above-mentioned synthetic polymers. In the case when natural rubber is used, it may be subjected to a pre-treatment such as, for example, a de-protein treatment prior to the hydrogenation treatment.

The molecular weight of conjugated diene polymer is not particularly limited, but the weight average molecular weight thereof as measured by gel permeation chromatography and expressed in terms of that of standard polystyrene is usually in the range of 5,000 to 500,000.

No limitation is imposed to the process by which the above-mentioned conjugated diene polymer is produced. The conventional emulsion polymerization process, solution polymerization process and bulk polymerization process can be adopted. Of these, emulsion polymerization process and solution polymerization process are preferable. Emulsion polymerization process is especially preferable.

The emulsion polymerization process may be carried out by any of batchwise, semi-batchwise and continuous polymerization procedures. The polymerization temperature and pressure are not particularly limited.

The conventional polymerization initiator and molecular weight modifier can be used. As specific examples of the polymerization initiator, there can be mentioned hydroperoxides such as benzoyl peroxide, t-butyl-hydroperoxide, diisopropylbenzene hydroperoxide and cumene hydroperoxide; and aliphatic azo compounds such as azobisisobutyronitrile and 2,2'-azobis(2,4-dimethylvaleronitrile). As specifice examples of the molecular weight modifier, there can be mentioned mercapto group-containing molecular weight modifiers such as t-octyl mercaptan, n-dodecyl mercaptan and t-dodecyl mercaptan; alkyl halides such as dichloromethane, dibromomethane and carbon tetrachloride; alcohols such as methanol and ethanol; and α-methylstyrene dimmer. Of these, mercapto group-containing molecular weight modifiers are preferable.

No limitation is imposed to the emulsifier used for polymerization, and, anionic surfactants, cationic surfactants, amphoteric surfactants and nonionic surfactants can be used. Of these, anionic surfactants are preferable.

The polymerization reaction is terminated usually by adding a conventional polymerization stopper. The polymerization conversion is not particularly limited and can be appropriately chosen, but, from a viewpoint of efficiency for polymer production, a high polymerization conversion is preferable. The polymerization conversion is usually at least 70% and preferably at least 80%.

After completion of polymerization, conjugated diene monomer and other monomers remaining unreacted in the polymerization system are preferably removed by the conventional procedure. The monomers removed from the polymerization system can be purified for reuse as a raw material for polymerization.

In the case when the conjugated diene polymer is produced by an emulsion polymerization process or a solution polymerization process, the polymerization liquid is coagulated by a method ordinarily industrially adopted to recover a solid polymer, and the recovered solid polymer is preferably dissolved in a solvent and subjected to a hydrogenation step in a solution state.

The solvent used for the preparation of recovered polymer is not particularly limited provided that it does not give any adverse effect on a hydrogenation catalyst and it is capable of dissolving the polymer. As specific examples of the solvent, there can be mentioned chain aliphatic hydrocarbons and cyclic aliphatic hydrocarbons, such as n-hexane, cyclohexane and n-heptane; aromatic hydrocarbons such as benzene, toluene, xylene and chlorobenzene; ketones such as acetone, methyl ethyl ketone, diethyl ketone, methyl isopropyl ketone, 2-pentanone, 3-pentanone, cyclopentanone and cyclohexanone; ethers such as diethyl ether, tetrahydrofuran, dioxane and anisole; and esters such as ethyl acetate. Of these, ketones are preferable.

The polymer as obtained by an emulsion or solution polymerization process can be subjected, as it is without recovering from a polymerization liquid, to hydrogenation step. This procedure can be adopted advantageously for the hydrogenation of polymer obtained by an emulsion polymerization process. Namely, an emulsion polymerization liquid (which liquid is hereinafter referred to as "latex") can be advantageously hydrogenated in a continuous manner without subjecting to an after-treatment such as coagulation or recovery.

The concentration of polymer in the polymer solution or latex is not particularly limited, but is usually in the range of 1 to 70% by weight, preferably 2 to 50% by weight and more preferably 3 to 40% by weight, based on the total weight of the solution or latex. When the concentration of polymer is too high, the viscosity of polymer liquid is too large to efficiently stir at a hydrogenation step. In contrast, when the concentration of polymer is too low, the production efficiency of hydrogenated polymer is low.

Hydrogenation Process

The hydrogenation process of the present invention is characterized in that a conjugated diene polymer is hydrogenated in the presence of a catalyst comprising a platinum group metal or its compound, and a basic compound. By the phrase "in the presence of a catalyst comprising a platinum group metal or its compound, and a basic compound", we mean the state in which the catalyst and a basic compound are present in a hydrogenation reaction system in a manner such that both of the catalyst and the basic compound are capable of being contacted with the conjugated diene polymer.

(Hydrogenation Catalyst)

The hydrogenation catalyst includes platinum group metals such as ruthenium, rhodium, palladium, osmium, iridium and platinum, and compounds containing these platinum group metals. Of these, palladium and rhodium, and palladium- or rhodium-containing compounds are preferable. Palladium and palladium-containing compounds are especially preferable. The hydrogenation catalysts may be used either alone or as a combination of at least two kinds thereof. In the case when at least two kinds of hydrogenation catalysts are used, the active ingredients thereof are preferably mainly comprised of platinum.

The palladium compounds include compounds of palladium having a valency of II or IV, which are in the form of, for example, a salt, a complex or a complex salt. As specific examples of the palladium compounds, there can be mentioned organic acid salts such as palladium acetate and palladium cyanate; halides such as palladium fluoride, palladium chloride, palladium fluoride and palladium iodide; oxo-acid salts such as palladium nitrate and palladium sulfate; palladium oxide; palladium hydroxide; and complexes and complex salts such as dichlorocyclooctadienepalladium, dichloronorbornadienepalladium, tetrakisacetonitrilepalladium tetrafluoroborate, tetrakisbenzonitrilepalladium di-tetrafluoroborate, dichlorobisacetonitrilepalladium, dichlorobisethylenediaminepalladium, bisacetylacetonatopalladium, tris-triphenylphosphineacetonitrilepalladium tetrafluoroborate, dichlorobistriethylphosphinepalladium, dichlorobis-(dimethylsulfide)palladium, dibenzoylsulfidepalladium, bis(2,2'-bipyridine)palladium perchlorate and tetrakis-(pyridine)palladium dichloride.

As these palladium compounds, commercially available palladium compounds may be used. These palladium compounds can be prepared by the methods as described in Shin Jikken-kagaku Koza (New Lectures of Experimental Chemistry), volumes 8 and 12, published by Maruzen Co., Japan, 1976; and Chemistry and Application of Noble Metals, published by Kodansha Scientific Co., 1984.

As specific examples of the rhodium compounds, there can be mentioned halides such as rhodium chloride, rhodium bromide and rhodium iodide; inorganic acid salts such as rhodium nitrate and rhodium sulfate; organic acid salts such as rhodium acetate, rhodium formate, rhodium propionate, rhodium butyrate, rhodium valerate and rhodium naphthenate; rhodium oxide, rhodium trihydroxide; and complex compounds such as dichloro-bis(triphenylphosphine) rhodium, trichlorotris-pyridinerhodium, tetrarhodium dodecacarbonyl, dirhodium octacarbonyl, hexarhodium hexadecarbonyl, rhodium dicarbonylacetylacetonate, rhodium carbonyl(1-phenylbutane-1,3-dion), tris(hexane-2,4-dion)rhodium, tris(heptane-2,4-dion)rhodium, tris(1-phenylbutane-1,3-dion)

rhodium, tris(3-methylpentane-2,4-dion)rhodium and tris(1-cyclohexylbutane-1,3-dion)rhodium.

Hydrogenation catalysts are used usually as a heterogeneous catalyst, i,e, as a supported catalyst, which is supported on a conventional catalyst carrier such as active carbon, activated clay, alumina gel, silica gel and diatomaceous earth. The amount of the supported catalytically active metal ingredient is usually in the range of 0.5 to 80% by weight, preferably 1 to 50% by weight and more preferably 2 to 30% by weight, based on the weight of carrier.

The catalytically active metal ingredient can be supported on the carrier by conventional methods such as, for example, a dipping method, a coating method, a spraying method, an adsorption method and a precipitation method. The support on which the catalytically active metal ingredient has been supported can be molded into an appropriate shape such as, for example, spherical, columnar, polyhedral and honeycomb shapes, which shape varies depending upon the particular kind of reactor and type of reaction.

The catalyst may also be used as a homogeneous catalyst, i.e., a non-supported catalyst.

(Basic Compound)

The basic compound used in the present invention is not particularly limited, and includes, for example, alkali metal compounds, alkaline earth metal compounds, ammonia, ammonium salt compounds and organic amine compounds. Of these, alkali metal compound and alkaline earth metal compounds are preferable.

As specific examples of the alkali metal compound, there can be mentioned hydroxides such as lithium hydroxide, sodium hydroxide and potassium hydroxide; carbonate salts such as sodium carbonate and potassium carbonate; hydrogencarbonate salts such as sodium hydrogencarbonate and potassium hydrogencarbonate; oxides such as lithium oxide, potassium oxide and sodium oxide; fatty acid salts such as potassium acetate and sodium acetate; alkoxides such as lithium methoxide, lithium ethoxide, sodium methoxide, sodium ethoxide and potassium t-butoxide; and phenoxides such as sodium phenoxide and potassium phenoxide. Of these, hydroxides, carbonate salts and hydrogencarbonate salts of alkali metals are preferable. Hydroxides of alkali metals are especially preferable.

As specific examples of the alkaline earth metal compound, there can be mentioned hydroxides, carbonate salts, hydrogencarbonate salts, oxides, fatty acid salts compounds, alkoxides and phenoxides of alkaline earth metals. Of these, hydroxides, carbonate salts and hydrogencarbonate salts of alkaline earth metals are preferable. Hydroxides of alkaline earth metals are especially preferable.

As specific examples of the ammonium salt compound, there can be mentioned ammonium carbonate and ammonium hydrogencarbonate. The organic amine compound includes aliphatic, alicyclic and aromatic mono- and polyamino compounds, and, as specific examples thereof, there can be mentioned triethylamine, ethanolamine, morpholine, N-methylmorpholine, pyridine, hexamethylenediamine, dodecamethylenediamine and xylylenediamine.

These basic compounds may be used either as they are, or as a solution or dispersion in water or an organic solvent. They may also be used either alone or as a combination of at least two thereof.

The process for hydrogenating a conjugated diene polymer in the presence of the above-mentioned hydrogenation catalyst and the basic compound includes, for example, (1) a process wherein a conjugated diene polymer is hydrogenated in a reaction system prepared by incorporating the catalyst and the basic compound in a solution or latex of the conjugated diene polymer (hereinafter referred to as "first hydrogenation process"); (2) a process wherein a conjugated diene polymer is hydrogenated in a reaction system prepared by incorporating a catalyst system comprising a combination of the catalyst with the basic compound, in a solution or latex of the conjugated diene polymer (hereinafter referred to as "second hydrogenation process"); and (3) a process wherein a conjugated diene polymer is hydrogenated in a reaction system prepared by incorporating the catalyst in a solution of a composition comprising the conjugated diene polymer and the basic compound (hereinafter referred to as "third hydrogenation process"). If desired, these three processes may be adopted in combination.

The above-mentioned three processes will be described in turn.

(First Hydrogenation Process)

In the first hydrogenation process, a catalytic hydrogenation reaction is carried out under basic conditions (pH>7), i.e., in the presence of a basic compound in an amount sufficient for a hydrogenation reaction liquid to exhibit basicity. In this reaction system, preferably a solution having the conjugated diene polymer dissolved therein, or a latex of the conjugated diene polymer is used.

Under neutral or acidic conditions, the object of the present invention is difficult to achieve. The basic conditions are not particularly limited provided that the pH value of the hydrogenation reaction system as measured by a pH measuring apparatus is larger than 7. The pH value of the hydrogenation reaction system is usually in the range of 7.2 to 13, preferably 7.5 to 12.5 and more preferably 8.0 to 12.

The pH value is measured as follows. In the case when a solution of polymer in an organic solvent is used as the hydrogenation reaction liquid, 6 g of a polymer is dissolved in 100 g of an organic solvent to prepare a polymer solution. While the polymer solution is stirred, 2 ml of distilled water is dropwise added, and, when two minutes elapse, the measurement is conducted. In the case when a latex of polymer is used, the measurement is conducted on the polymer latex as it is.

The method for preparing the basic hydrogenation reaction liquid is not particularly limited, and includes, for example, (i) a method wherein a basic compound is added at a step of dissolving a polymer in a solvent to prepare a polymer solution; (ii) a method wherein a basic compound is added after a polymer solution or polymer latex is placed in a hydrogenation reaction apparatus, but before the commencement of hydrogenation reaction; and (iii) a method wherein a basic compound is added to a reaction liquid after the commencement of hydrogenation reaction.

(Second Hydrogenation Process)

In the second hydrogenation process, the hydrogenation of a conjugated diene polymer is carried out in a reaction system prepared by incorporating a catalyst system comprising a combination of a catalyst comprising a platinum group metal or its compound (hereinafter referred to as "catalytically active ingredient" when appropriate) with a basic compound, in a solution or latex of the conjugated diene polymer.

The platinum group metal or its compound and the basic compound, as used herein, are as mentioned above. Among the platinum group metal compounds, palladium compounds and rhodium compounds are preferable. Organic acid salts such as acetate salts and cyanides; halides such as chlorides, bromides and iodides; oxo-acid salts such as nitrates and sulfates; and oxides are especially preferable. Palladium acetate, palladium chloride, palladium nitrate and palladium sulfate are especially preferable. The basic compounds as used herein are the same as mentioned above. Preferable basic compounds are selected from alkali metal compounds and alkaline earth metal compounds.

The combination of a catalyst comprising a platinum group metal or its compound with a basic compound, as used herein, means a combination of a catalytically active ingredient, i.e., a platinum group metal or its compound, with a basic compound having a function of enhancing the catalytic activity, wherein the catalytically active ingredient and the basic compound have been contacted with each other. The contact of the catalytically active ingredient with the basic compound can be conducted usually at a step of preparing the catalyst in a catalyst-preparing vessel, or at a step of hydrogenating a conjugated diene polymer in a hydrogenation reaction vessel. The contact of the two components is conducted usually by way of a solvent or carrier for catalyst preparation, or a liquid medium such as hydrogenation reaction medium or solid support for hydrogenation of polymer.

A combination of a platinum group compound of non-reduced state or its compound with a basic compound can be used as a hydrogenation catalyst system. By the term "non-reduced state" as used herein, we mean that a reducing treatment using a reducing agent for converting the metal compound into metal at a catalyst-preparing step has not been conducted. When this catalyst system is introduced into a hydrogenation reaction system for hydrogenating a conjugated diene polymer, the catalytically active ingredient is reduced with hydrogen and with an optionally used other reducing agent to thereby exhibit a high catalytic activity.

The hydrogenation catalyst system comprising a platinum group metal or its compound, combined with a basic compound, and the hydrogenation catalyst system comprising a platinum group metal compound of non-reduced state, combined with a basic compound will be specifically described.

The catalytically active ingredient combined with a basic compound can be supported on a carrier for use as a heterogeneous catalyst (non-supported catalyst). The carrier can be appropriately selected from those which are conventionally used as catalyst carrier, such as hydroxides, silicates, aluminates and oxides of various metals; carbon; active clay; diatomaceous earth; and zeolites.

Among the carriers, a basic carrier is preferably used. In the case when a basic carrier is used, (i) the basic carrier can be comprised of the basic compound used in combination with the catalytically active ingredient (namely, the basic carrier can be used as the basic compound itself to be used in combination with the catalytically active ingredient), or (ii) the basic carrier can be used in combination with other basic compound used in combination with the catalytically active ingredient for promoting or keeping the activity of said other basic compound. In the case of using the basic carrier as the basic compound in combination with the catalytically active agent in (i) above, when an aqueous solution of a palladium compound is prepared for supporting the palladium compound on the basic carrier, an acidic substance used for promoting the dissolution of the palladium compound in water must be used in a minimum required amount so that the basic carrier is not neutralized.

No limitation is imposed to the basic carrier provided that the basic carrier has a function sufficient for supporting a palladium compound and exhibits basicity. As specific examples of the basic carrier, there can be mentioned magnesium hydroxide, calcium hydroxide, barium hydroxide, basic aluminum hydroxide, magnesium oxide, yttrium oxide, magnesium silicate, calcium silicate and sodium aluminate.

The manner in which the combination of a catalytically active ingredient with a basic compound is supported on a carrier is not particularly limited. Usually, first, (A) a solution of the catalytically active ingredient, preferably an aqueous solution thereof, and (B) a slurry of the carrier suspended in a solvent preferably water, are prepared; and the basic compound is incorporated in at least one of the solution (A) and the slurry (B), preferably in the solution (A). Then the solution (A) and the slurry (B) are mixed thoroughly whereby the carrier is impregnated with the catalytically active ingredient. The mixed liquid of (A) and (B) must have a pH value of larger than 7. The pH value is usually in the range of 7.2 to 13, preferably 7.5 to 12.5 and more preferably 8.0 to 12.

The preparation of the above-mentioned solution (A) is preferably carried out by using an acidic substance for promoting the dissolution of the catalytically active ingredient. Such acidic substance includes, for example, hydrochloric acid, sulfuric acid, nitric acid, acetic acid and bromic acid. The amount of the acidic substance varies depending upon the particular amount of the basic compound, that is, can be appropriately chosen so that the mixed liquid of (A) and (B) has a pH value of larger than 7.0.

The temperatures of the solution (A), the slurry (B) and the mixed liquid of (A) with (B) are not particularly limited. The preparation of these liquids is usually carried out at room temperature, but, it can be carried out at a higher temperature, more specifically in the range of about 30° C. to about 60° C. The time for which the catalytically active ingredient is contacted with the basic compound is also not particularly limited, but is usually in the range of 10 minutes to 10 hours. This contact time can be appropriately chosen depending upon the liquid temperature at the time of treatment, the kind of carrier, and the amount of platinum group metal or its compound.

The procedure for recovering and drying the thus-prepared supported catalyst is not particularly limited, and a conventional procedure can be adopted. For example, a procedure wherein a solid content is filtered and then dried under a reduced pressure, and a procedure wherein the as-prepared supported catalyst-containing liquid is heated, as it is, to dryness. The thus-obtained supported catalyst exhibits a high catalytic activity for the hydrogenation of conjugated diene polymer even when the catalyst is used without a reduction treatment.

The hydrogenation catalyst system used in the second hydrogenation process further includes a non-supported catalyst, namely, homogeneous catalyst as another embodiment thereof. The catalytically active ingredient used in the non-supported catalyst is not particularly limited provided that the catalytically active ingredient is soluble in a hydrogenation reaction liquid, but, acidic metal compounds, especially acidic palladium compounds are preferably used. As specific examples of the acidic palladium compounds, there can be mentioned palladium salts of carboxylic acids such as formic acid, acetic acid, propionic acid, lauric acid, succinic acid, stearic acid, oleic acid, phthalic acid and benzoic acid; halides of palladium compounds such as palladium chloride, dichloro(cyclooctadiene)palladium, dichloro(norbornadiene)palladium, dichlorobis(triphenylphosphine)palladium, sodium tetrachloropalladate and ammonium hexachloropalladate; palladium bromide; palladium iodide; and inorganic palladium compounds and complex salts, such as palladium nitrate, palladium sulfate and potassium tetracyanopalladate.

Of these acidic palladium compounds, palladium salts of carboxylic acids, palladium nitrate, palladium sulfate, palladium chloride, sodium tetrachloropalladate and ammonium hexachloropalladate are preferable. Palladium salts of carboxylic acids, palladium nitrate and palladium chloride are especially preferable.

The acidic palladium compounds can be chosen from commercially available compounds or can be prepared by the conventional procedure. The acidic palladium compounds can be used either as they are or as a solution in a solvent such as water. In the case when the acidic palladium compounds are used as an aqueous solution, an inorganic acid such as nitric acid, sulfuric acid, hydrochloric acid or bromic acid; a sodium salt or a potassium salt of these acids; or an organic acid such as acetic acid is preferably incorporated in the aqueous solution to enhance solubility of the acidic palladium compounds.

Among the aqueous solutions of acidic palladium compounds, aqueous solutions of palladium nitrate, palladium chloride, palladium sulfate, palladium acetate, sodium tetrachloropalladate and potassium teterachloropalladate are preferably used. An aqueous solution of palladium nitrate or palladium chloride, combined with sodium chloride, potassium chloride or hydrochloric acid, is especially preferable.

The basic compounds used in combination with the catalytically active ingredient can be chosen from those which are mentioned above. Sodium hydroxide and potassium hydroxide are especially preferable. The amount of basic compound is usually in the range of 0.3 to 10 molar equivalents, preferably 0.5 to 5 molar equivalents, per molar equivalent of palladium element. However, in the case when an aqueous solution of an acidic palladium compound, combined with an acid, is used, the amount of basic compound is in the range of 0.3 to 10 molar equivalents, preferably 0.5 to 5 molar equivalents, per molar equivalent of the sum of platinum group metal and the acid. The basic compound is preferably used in an aqueous solution form.

The non-supported catalyst is prepared by mixing an aqueous acidic solution of the above-mentioned platinum group metal compound with a basic compound. More specifically, a basic compound is incorporated in a solution of a conjugated diene polymer to be hydrogenated, or in a latex of said polymer, and then an aqueous acidic solution of the platinum group metal compound is added to the polymer solution or latex whereby a hydrogenation catalyst is prepared in a hydrogenation reaction system. The non-supported catalyst is especially suitable for the case where a conjugated diene polymer latex is hydrogenated as it is.

When the non-supported catalyst is prepared, a colloid protective agent is preferably used to keep the stability of an aqueous acidic solution of the platinum group metal compound. As specific examples of the colloid protective agent, there can be mentioned polyvinyl pyrrolidone, polyvinyl alcohol, polyvinyl acetal, poly(sodium acrylate), gelatin and albumin. Of these, polyvinyl pyrrolidone, polyvinyl alcohol and poly(sodium acrylate) are preferable.

(Third Hydrogenation Process)

In the third hydrogenation process, the hydrogenation of a conjugated diene polymer is carried out in a reaction system prepared by incorporating a catalyst comprising a platinum group metal or its compound in a solution of a composition comprising the conjugated diene polymer and a basic compound.

The composition comprising the conjugated diene polymer and a basic compound preferably includes a basic compound-containing conjugated diene polymer composition exhibiting a pH value exceeding 7, as measured on a solution of the composition in tetarhydrofuran (hereinafter abbreviated to "THF" when appropriate). The pH value is preferably in the range of 7.2 to 12, more preferably 7.5 to 11.5 and most preferably 8 to 11. If the pH value is not larger than 7, the rate of reaction is low and the benefit obtained by the incorporation of basic compound is poor even when a large amount of hydrogenation catalyst is used.

By the phrase "pH value as measured on a solution of the composition in tetarhydrofuran" as used herein, we mean a pH value which is measured by a method wherein 6 g of the basic compound-containing conjugated diene polymer composition is dissolved in 100 g of THF; while the thus-prepared polymer solution is stirred, 2 ml of distilled water is added to the polymer solution; and, when 2 minutes elapses, the measurement of pH is conducted by a pH measuring apparatus.

The procedure for preparing the basic compound-containing conjugated diene polymer composition is not particularly limited, and includes, for example, a procedure wherein a step of contacting a conjugated diene polymer with an aqueous basic compound solution (hereinafter referred to as "aqueous basic solution" when appropriate) is provided at an appropriate stage after a step of polymerization. Preferably the basic compound-containing conjugated diene polymer composition is prepared by a procedure wherein a crumb obtained by coagulating a conjugated diene polymer as produced in a polymerization step is contacted with an aqueous solution of the basic compound. By this procedure, the basic compound-containing conjugated diene polymer can be obtained easily and with high reliability.

The polymer as produced in the polymerization step is usually in the state of latex, and a crumb thereof can be obtained by coagulating the polymer latex by the conventional procedure. The coagulation procedure includes, for example, a continuous procedure wherein the polymer latex or a coagulating agent is continuously or intermittently introduced into a coagulating vessel, and the coagulated polymer slurry (i.e., a mixture of crumb with serum water) is continuously or intermittently withdrawn from the vessel; and a batch-wise procedure wherein the polymer latex and a coagulating agent are stirred for a certain period of time in a coagulating vessel, and then the coagulated polymer slurry is withdrawn.

The coagulating agent can be selected from those which are conventionally used and include, for example, inorganic acids such as hydrochloric acid and sulfuric acid; organic acids such as acetic acid and formic acid; and metal salts of an organic acid and metal salts of an inorganic acid. As specific examples of the metal salts, there can be mentioned sodium chloride, potassium chloride, aluminum chloride, aluminum sulfate and magnesium sulfate. Of these, aluminum sulfate, magnesium sulfate and calcium chloride are preferable. These metal salts are usually used in as an aqueous solution form. As a coagulating aid, a water-soluble high molecular weight compound such as polyethylene oxide or polyvinyl alcohol can be used.

Two or more coagulating vessels arranged in series can be used, if needed. The type or shape of the coagulating vessel is not particularly limited, and, for example, a closed type vessel and an open type vessel can be adopted. The concentration of crumb in the coagulating vessel is preferably in the range of 3 to 60% by weight, more preferably 5 to 50% by weight and especially preferably 6 to 40% by weight.

To contact the crumb with the aqueous basic solution with an enhanced efficiency, crumbs with a small size and a high porosity are desired. Particle diameter (maximum diameter) of crumb is preferably not larger than 5 mm and more preferably not larger than 3 mm. The particle diameter of crumb can be controlled by appropriately choosing the kind and amount of coagulating agent, and coagulation temperature and other coagulation conditions. The amount of coagulating agent is usually in the range of 1 to 100% by weight, preferably 2 to 50% by weight, based on the polymer as produced in the polymerization step. The coagulation temperature is usually in the range of 5° C. to 80° C., preferably 10° C. to 60° C.

A slurry containing the crumb as produced by coagulation is fed into a vessel for contacting the crumb with an aqueous basic solution (which vessel is hereinafter referred to as "base treatment vessel"). To prevent or minimize dilution or neutralization of the aqueous basic solution with the serum water contained in the crumb-containing slurry, it is preferable that the crumb slurry is partially dehydrated during transportation of the crumb slurry so that part of the serum water is removed. One or more washing vessels for washing the crumb with water may be provided between the coagulation vessel and the base treatment vessel. After the precipitation of crumb in the coagulation vessel, a basic compound or a solution thereof in an amount sufficient for rendering the crumb-containing slurry basic can be incorporated in the coagulation column. In this case, the coagulation vessel also is a base treatment vessel.

The aqueous basic solution to be contacted with the crumb usually has a pH value in the range of 8 to 13.5, preferably 9 to 13 and more preferably 10 to 12.5. To prevent the change of the pH of the aqueous basic solution due to the crumb-containing slurry flowing out from the coagulation vessel and the optional water-washing vessels, it is preferable that the pH value of liquid within the base treatment vessel is monitored, and an aqueous basic solution can appropriately be supplemented from an aqueous basic solution reservoir into the base treatment vessel.

The contact of the crumb with the aqueous basic solution may be carried out either in a batch-wise or continuous manner, which can be selected depending upon the particular rate of treatment or other factors. In the case when the contact is carried out in a continuous manner, the contact time as expressed by the average residence time, which is calculated by dividing the volume of liquid in the base treatment vessel by the flow rate of slurry per unit time flowing into the base treatment vessel, is usually in the range of 5 minutes to 10 hours, preferably 10 minutes to 5 hours. To avoid short-circuit of the slurry flowing in the base treatment vessel, the base treatment vessel is preferably equipped with a stirring apparatus. The contact temperature, i.e., the temperature of aqueous basic solution at the time of contact, is usually in the range of 10° C. to 80° C., preferably 20° C. to 70° C.

The aqueous basic solution is prepared by dissolving known inorganic or organic basic compounds in water. The basic compounds include those which are recited above. The aqueous basic solution is preferably selected from aqueous solutions of inorganic basic compounds such as alkali metal compounds and alkaline earth metal compounds. The basic compounds may be used either alone or as a combination of at least two thereof. The concentration of basic compound in the aqueous basic solution is usually in the range of 0.5 to 10% by weight, preferably 1 to 5% by weight.

After the contact of the crumb with the aqueous basic solution, the crumb is passed through a water-washing vessel optionally provided downstream from the base treatment vessel, and then dehydrated and recovered. Thereafter the crumb is further dehydrated, for example, by a centrifugal dehydrator or a squeezer, and then dried, for example, by a band dryer, an air stream dryer or an extrusion dryer.

The platinum group metal or its compound, which is used for catalytic hydrogenation of the basic compound-containing conjugated diene polymer prepared as mentioned above, is as described above. The kind and amount of carrier, and the procedure for allowing the catalyst on the carrier are as described above.

In the third hydrogenation procedure, the polymer is hydrogenated in a state of solution. The solvent used for the preparation of the solution, and the concentration of polymer in the solution are as described above with respect to the dissolution of the polymer.

(Hydrogenation Reaction Conditions)

The temperature for hydrogenation reaction adopted in the above-mentioned three hydrogenation processes is usually in the range of 0° C. to 200° C., preferably 5° C. to 150° C. and more preferably 10° C. to 100° C. If the reaction temperature is too high, side reactions such as hydrogenation of a nitrile group tend to occur and a reaction solvent is undesirably hydrogenated. In contrast, if the reaction temperature is too low, the rate of reaction is reduced to a practically unacceptable extent.

The pressure of hydrogen is usually in the range of from the atmospheric pressure to 20 MPa, preferably from the atmospheric pressure to 15 MPa and more preferably from the atmospheric pressure to 10 MPa. The reaction time is not particularly limited, but is usually in the range of 30 minutes to 50 hours.

After completion of the hydrogenation reaction, the catalyst is usually removed for recovery from a reaction mixture by conventional catalyst-removing procedures such as filtration, adsorption separation and centrifugal separation. The recovered catalyst can be reused for hydrogenation as it is or, if desired, after a regeneration treatment. Occasionally the catalyst may remain in the hydrogenated polymer without separation.

The method for separating the hydrogenated polymer from the hydrogenation reaction mixture is not particularly limited and conventional industrial methods can be adopted. For example, there can be adopted a steam coagulation method wherein the reaction mixture is directly contacted with steam; a method wherein the reaction mixture is dropped onto a heated rotary drum to evaporate the solvent from the reaction mixture; a direct drying method wherein the reaction mixture is heated under a reduced pressure to evaporate the solvent; and a method wherein a poor solvent is added to the reaction mixture to precipitate the hydrogenated polymer. The thus-separated hydrogenated polymer is dried, for example, by hot air drying, vacuum drying or extrusion drying whereby a solid hydrogenated polymer is recovered.

The degree of hydrogenation of polymer, namely, the ratio of the amount of the hydrogenated carbon-carbon double bonds in the hydrogenated polymer to the amount of carbon-carbon double bonds in the starting polymer, can be appropriately controlled in the range of 1 to 100% by adequately choosing the reaction conditions. The degree of hydrogenation as expressed by the iodine value is preferably not larger than 120.

EXAMPLES

The invention will now be described more specifically by the following examples and comparative examples that by no means limit the scope of the invention. Parts and percents in these examples are by weight unless otherwise specified.

Example 1

Preparation of Supported Catalyst Using Basic Compound [NaOH]

100 ml of an aqueous palladium nitrate solution having a palladium concentration of 10% was prepared using palladium nitrate available from NE-Chemcat Co. and distilled water. While the pH value of the aqueous palladium nitrate solution was monitored by a pH measuring apparatus, solid sodium hydroxide was added to adjust the pH value of the solution to 12. One liter of a slurry of carrier (magnesium silicate; available from Tomita Chem. Co.) containing 100 g of the carrier was prepared. 20 ml of the above-mentioned basic solution was mixed with one liter of the carrier slurry. The resultant slurry had a pH value of 12. The slurry was stirred for 30 minutes, and then the solid content was filtered off and thoroughly washed with distilled water. The thus-recovered solid was vacuum-dried at 60° C. for 2 hours to give a supported catalyst. The amount of supported palladium as measured by atomic-absorption spectroscopy was 2%.

The supported catalyst was used for hydrogenation as it was without reducing treatment (as described in Example 3, below).

Comparative Example 1

Preparation of Supported Catalyst Under Acidic Conditions 100 ml of an aqueous palladium nitrate solution was prepared in the same manner as in Example 1. Nitric acid was added instead of solid sodium hydroxide to the aqueous palladium solution to adjust the pH value to an acidic region. 20 ml of the aqueous palladium nitrate solution having a pH value adjusted to 1 by the addition of nitric acid was mixed with one liter of the same carrier slurry as used in Example 1. The mixed slurry had a pH value of 3. While the slurry was stirred, the slurry was heated to dryness to give a supported catalyst. The amount of supported palladium was 2%.

The supported catalyst was used for hydrogenation as it was without reducing treatment (as described in Comparative Example 3, and Examples 11-13, below).

Example 2

Preparation of Supported Catalyst Using Basic Compound [Magnesium Silicate Carrier]

100 ml of an aqueous palladium chloride solution having a palladium concentration of 2% was prepared using palladium chloride available from NE-Chemcat Co. and distilled water. When this solution was prepared, 20 g of sodium chloride was added to promote the dissolution of palladium chloride. The palladium chloride was completely dissolved. The aqueous palladium chloride solution had a pH value of 3. One liter of a slurry of carrier (magnesium silicate) containing 100 g of the carrier was prepared in the same manner as in Example 1. The whole amount of the aqueous palladium chloride solution was mixed with one liter of the carrier slurry. The resultant slurry had a pH value of 8. The slurry was stirred for 30 minutes, and then the solid content was separated and dried in the same manner as in Example 1 to give a supported catalyst. The amount of supported palladium was 2%.

The supported catalyst was used for hydrogenation as it was without reducing treatment (as described in Example 4, below).

Comparative Example 2

Preparation of Supported Catalyst Under Acidic Conditions 100 ml of an aqueous palladium chloride solution having a palladium concentration of 2% was prepared using palladium chloride available from NE-Chemcat Co. and distilled water. When this solution was prepared, hydrochloric acid was added to the aqueous palladium chloride solution to completely dissolve the palladium chloride. The aqueous palladium chloride solution had a pH value of 0. One liter of a slurry of carrier (magnesium silicate) containing 100 g of the carrier was prepared in the same manner as in Example 1. The whole amount of the aqueous palladium chloride solution was mixed with one liter of the carrier slurry. The resultant slurry had a pH value of 4. The slurry was stirred for 30 minutes, and then the solid content was separated and dried in the same manner as in Example 1 to give a supported catalyst. The amount of supported palladium was 2%.

The supported catalyst was used for hydrogenation as it was without reducing treatment (as described in Comparative Example 4, below).

Reference Example 1

Production of Conjugated Diene Polymer a

An autoclave was charged with 180 parts of ion-exchanged water, 37 parts of acrylonitrile and 0.5 part of t-dodecylmercaptan in this turn. The inside atmosphere of the autoclave was replaced with nitrogen and then 63 parts of butadiene was introduced. The autoclave was cooled to 5° C., and 0.1 part of cumene hydroperoxide (polymerization catalyst) and 0.01 part of ferrous sulfate were added. Then the autoclave was rotated for 16 hours to thoroughly stir the content while the autoclave was maintained at 5° C. Then an aqueous hydroquinone solution having a concentration of 10% was added into the autoclave to stop the polymerization. A polymerization liquid was taken and concentrated under a reduced pressure by a rotary evaporator to give a butadiene-acrylonitrile copolymer a.

Examples 3, 4, Comparative Examples 3, 4

Hydrogenation of Conjugated Diene Polymer

The polymer produced in Reference Example 1 was dissolved in acetone to prepare a polymer solution having a concentration of 15%. An autoclave was charged with 60 parts of the polymer solution, and then 0.45 part of a hydrogenation catalyst was added. The inside atmosphere in the autoclave was replaced with nitrogen, and then replaced with hydrogen twice. Thereafter hydrogenation reaction was carried out at a hydrogen pressure of 5 MPa and a temperature of 50° C. for 6 hours. Each of the four kinds of catalysts prepared in Examples 1-2 and Comparative Examples 1-2 was used. After completion of the hydrogenation reaction by the above-mentioned procedures, each reaction liquid was concentrated under a reduced pressure by a rotary evaporator to give a hydrogenated polymer. The hydrogenation catalysts used and the percentage hydrogenation of polymer as measured by proton NMR are shown in Table 1.

TABLE 1

|  | Hydrogenation catalysts | Percentage hydrogenation |
| --- | --- | --- |
| Example 3 | Prepared in Ex. 1 | 95% |
| Comp. Ex. 3 | Prepared in Comp. Ex. 1 | 15% |
| Example 4 | Prepared in Ex. 2 | 98% |
| Comp. Ex. 4 | Prepared in Comp. Ex. 2 | 5% |

As seen from Table 1, catalysts prepared using a combination of a palladium compound with a basic compound (NaOH, magnesium silicate carrier) gave a large percentage hydrogenation even when a reducing treatment was not conducted in the catalyst preparing step (Examples 3,4). A catalyst prepared under acidic conditions without use of a basic compound gave a small percentage hydrogenation (Comparative Example 3). In Comparative Example 4, magnesium silicate carrier was used similarly to in Example 4, but, the preparation of catalyst was conducted under acidic conditions using hydrochloric acid (pH=4) and therefore, it is presumed that magnesium silicate was changed to magnesium chloride.

Examples 5-10

Preparation of Supported Palladium Catalysts Using Basic Carriers, and Hydrogenation of Conjugated Diene Polymers 100 ml of an aqueous palladium chloride solution having a palladium concentration of 2.5% was prepared using palladium chloride available from NE-Chemcat Co. and distilled water. When this solution was prepared, 20 g of sodium chloride was added to promote the dissolution of palladium chloride. The palladium chloride was completely dissolved. The aqueous palladium chloride solution had a pH value of 2. One liter of a carrier slurry containing 100 g of a carrier was prepared using each of the six kinds of basic carriers shown in Table 2. The whole amount of the aqueous palladium chloride solution was mixed with one liter of the carrier slurry. The resultant slurries had a pH value of larger than 7.5. Each slurry was stirred for 30 minutes, and then the solid content was separated and dried to give a supported catalyst. The amount of supported palladium on each of the supported catalysts was 2.5%.

Each supported catalyst was used for hydrogenation of a conjugated diene polymer without reduction treatment in the same manner as in Examples 3 and 4. The percentage hydrogenation of polymer as measured by proton NMR is shown in Table 2.

Comparative Examples 5, 6

Preparation of Supported Palladium Catalysts Using Acidic Carriers, and Hydrogenation of Conjugated Diene Polymers 100 ml of an aqueous palladium chloride solution having a palladium concentration of 2.5% was prepared using palladium chloride available from NE-Chemcat Co. and distilled water. When this solution was prepared, hydrochloric acid was added to the aqueous palladium chloride solution to completely dissolve the palladium chloride. The aqueous palladium had a pH value of 0. One liter of a carrier slurry containing 100 g of the carrier was prepared using each of the two kinds of acidic carriers shown in Table 2. The whole amount of the aqueous palladium chloride solution was mixed with one liter of the carrier slurry. The resultant slurry had a pH value of 0. The slurry was heated to dryness to give a supported catalyst. The amount of supported palladium was 2.5%.

The supported catalyst was used for hydrogenation as it was without reducing treatment in the same manner as in Examples 3 and 4. The percentage hydrogenation of polymer as measured by proton NMR is shown in Table 2.

TABLE 2

| | Kinds of carriers used | Percentage hydrogenation |
|---|---|---|
| Example 5 | Magnesium hydroxide *1 | 94% |
| Example 6 | Calcium hydroxide *1 | 72% |
| Example 7 | Basic aluminum hydroxide *1 | 63% |
| Example 8 | Yttrium oxide *1 | 98% |
| Example 9 | Calcium oxide *1 | 90% |
| Example 10 | Sodium aluminate *2 | 94% |
| Comp. Ex. 5 | Aluminum oxide *1 | 0% |
| Comp. Ex. 6 | Silicon oxide *3 | 0% |

*1 Supplied by Wako Pure Chemical Ind., Ltd.
*2 Supplied by Tomita Chem. Co.
*3 Supplied by Fuji Sisiria Co.

As seen from Table 2, catalysts comprising a palladium compound supported on a basic carrier exhibited a large percentage hydrogenation (Examples 5-10). In contrast, catalysts comprising a palladium compound supported on an acidic carrier exhibited small percentage hydrogenation (Comparative Examples 5, 6).

Reference Example 2

Purification of Conjugated Diene Polymer

An acrylonitrile-butadiene copolymer prepared by the same procedures as described in Reference Example 1 was dissolved in chloroform to give a polymer solution having a concentration of 2%. Concentrated hydrochloric acid in an amount equal to 1% of the polymer dissolved in the polymer solution was added to and thoroughly mixed with the polymer solution. A chloroform layer was taken and washed with distilled water until the washing reached a pH value of 7. Thereafter chloroform was distilled off under a reduced pressure, and the residue was dissolved in acetone to give a polymer solution in acetone with a concentration of 5%. The polymer solution was poured into distilled water in an amount of about three times in volume of the polymer solution to thereby precipitate the polymer. This re-precipitation procedure was repeated until a very clear acetone solution was obtained. An acetone solution of the thus-purified polymer exhibited a pH value of 6.5.

Examples 11-13

Hydrogenation of Conjugated Diene Polymer Under Basic Conditions

The polymer produced in Reference Example 2 was dissolved in acetone to prepare a polymer solution having a concentration of 15%. To 60 parts of the polymer solution, 0.5 part of an aqueous saturated solution of a basic compound was added, and the mixed liquid was stirred for 10 minutes. The pH value of the mixed liquid was measured. An autoclave was charged with the mixed liquid, and the supported catalyst prepared in Comparative Example 1 was added to the mixed liquid. The inside atmosphere in the autoclave was replaced with nitrogen, and then hydrogenation reaction was carried out at a hydrogen pressure of 5 MPa and a temperature of 50° C. for 6 hours. The basic compounds used, the measured pH values and the percentage hydrogenation of polymers are shown in Table 3.

Comparative Example 7

Hydrogenation of Conjugated Diene Polymer Under Basic Conditions

Hydrogenation of polymer was carried out by the same procedures as described in Examples 11-13 except that the basic compound was not used. The measured pH value of a polymer solution and the percentage hydrogenation of polymer are shown in Table 3.

Example 14

Hydrogenation of Conjugated Diene Polymer Under Basic Conditions

Palladium chloride was dissolved in an aqueous saturated sodium chloride solution. The resultant solution was heated to remove water by evaporation. Ethanol was added to the thus-obtained dry solid to extract sodium tetrachloropalladate. Ethanol was distilled off under a reduced pressure from the solution to give sodium tetrachloropalladate (non-supported catalyst). Using this non-supported catalyst in an amount of 0.1% as palladium metal based on the weight of polymer, hydrogenation of polymer was carried out by the same procedures as described in Example 11. The basic compound used, the measured pH value and the percentage hydrogenation of polymer are shown in Table 3.

Comparative Example 8

Hydrogenation of Conjugated Diene Polymer Under Acidic Conditions

Hydrogenation of polymer was carried out by the same procedures as described in Example 14 except that the basic compound was not used. The measured pH value of a polymer solution and the percentage hydrogenation of polymer are shown in Table 3.

TABLE 3

| | Type of Catalyst | Basic compound | pH value | Percentage hydrogenation |
|---|---|---|---|---|
| Example 11 | Supported | Potassium hydroxide | 10.5 | 95% |
| Example 12 | Supported | Sodium hydroxide | 9.0 | 93% |
| Example 13 | Supported | Sodium carbonate | 7.5 | 89% |
| Comp. Ex. 7 | Supported | Not used | 6.5 | 10% |
| Example 14 | Non-supported | Sodium hydroxide | 9.0 | 92% |
| Comp. Ex. 8 | Non-supported | Not used | 6.5 | 5% |

As seen from Table 3, when hydrogenation of a conjugated diene polymer was carried out under basic conditions, both of a supported catalyst and a non-supported catalyst exhibited greatly enhanced catalytic activity (Examples 15-21). In contrast, when a basic compound was not used, the catalytic activity was low (Comparative Examples 7, 8).

Examples 15-21, Comparative Example 9

Hydrogenation of Emulsion-Polymerized Polymer Latex

As conjugated diene polymer latex to be hydrogenated, a butadiene-acrylonitrile copolymer (NBR; bound acrylonitrile content: 37.5%) latex having an average particle diameter of 0.09 μm prepared by emusion polymerization using sodium dodecylbenzenesulfonate as an emulsifier was used.

To palladium acetate (Pd/NBR ratio=700 ppm), nitric acid in an amount of 5 times in molar equivalent of palladium element was added to give 300 ml of an acidic palladium solution. To the aqueous acidic palladium solution, polyvinyl pyrrolidone having a weight average molecular weight of 5,000 (colloid stabilizer) in an amount of 5 times in weight of palladium element was added. Further, a basic compound shown in Table 4 was added to prepare an aqueous solution of catalyst.

The total solid content in the above-mentioned NBR latex was adjusted to 30%. One liter autoclave equipped with a stirrer was charged with 400 ml of the latex and the above-mentioned catalyst solution. The inside atmosphere in the autoclave was replaced with nitrogen, and then replaced with hydrogen twice. Thereafter hydrogenation reaction was carried out at a hydrogen pressure of 5 MPa and a temperature of 50° C. for 6 hours. After completion of hydrogenation, each reaction liquid was concentrated under a reduced pressure by a rotary evaporator to give a hydrogenated polymer. The percentage hydrogenation of polymer is shown in Table 4 (Examples 15-21).

For comparison, the above-mentioned procedures were repeated wherein the above-mentioned aqueous acidic palladium solution was used without addition of a basic compound. The results are also shown in Table 4 (Comparative Example 9).

TABLE 4

| | Basic compound (ratio of molar equivalent to sum of Pd + nitric acid | | Percentage hydrogenation |
|---|---|---|---|
| Example 15 | KOH | (1.1) | 93% |
| Example 16 | KOH | (2.0) | 95% |
| Example 17 | KOH | (5.0) | 94% |
| Example 18 | Mg (OH)$_2$ | (1.0) | 76% |
| Example 19 | NaOH | (1.5) | 95% |
| Example 20 | NaHCO$_3$ | (1.5) | 85% |
| Example 21 | K$_2$CO$_3$ | (1.5) | 80% |
| Comp. Ex. 9 | Not used | (0) | 38% |

As seen from Table 4, in the case when an aqueous catalyst solution prepared by adding a predetermined amount of a basic compound to an aqueous acidic palladium solution was used as a hydrogenation catalyst, the catalytic activity was greatly enhanced.

Examples 22-24, Comparative Example 10

Hydrogenation of Emulsion-Polymerized Polymer Latex

To palladium acetate (Pd/NBR ratio=700 ppm), nitric acid in an amount of 5 times in molar equivalent of palladium element was added to give 300 ml of an acidic palladium solution. To the aqueous acidic palladium solution, polyvinyl pyrrolidone having a weight average molecular weight of 5,000 in an amount of 5 times in weight of palladium element was added to prepare an aqueous acidic palladium solution. As the conjugated diene polymer latex to be hydrogenated, the same NBR latex as used in Examples 15-21 was used. The total solid content of the NBR latex was adjusted to 30%.

One liter autoclave equipped with a stirrer was charged with 400 ml of the latex and the basic compound shown in Table 5, and the content was stirred. The inside atmosphere in the autoclave was replaced with nitrogen, and then replaced with hydrogen twice. Thereafter hydrogenation reaction was carried out at a hydrogen pressure of 5 MPa and a temperature of 50° C. for 6 hours. After completion of hydrogenation, each reaction liquid was concentrated under a reduced pressure by a rotary evaporator to give a hydrogenated polymer. The percentage hydrogenation of polymer is shown in Table 5 (Examples 22-24).

For comparison, the above-mentioned procedures were repeated wherein the above-mentioned aqueous acidic palladium solution was used as it was without addition of a basic compound to the polymer latex. The results are also shown in Table 5 (Comparative Example 10).

TABLE 5

|  | Basic compound (ratio of molar equivalent to sum of Pd + nitric acid | | Percentage hydrogenation |
|---|---|---|---|
| Example 22 | KOH | (1.1) | 83% |
| Example 23 | KOH | (2.0) | 85% |
| Example 24 | KOH | (5.0) | 87% |
| Comp. Ex. 10 | Not used | (0) | 41% |

As seen from Table 5, in the case when a predetermined amount of a basic compound was added to a conjugated diene polymer latex and then an aqueous acidic palladium solution was added to prepare a hydrogenation catalyst system in a hydrogenation reaction system, the catalytic activity was greatly enhanced.

Reference Example 3

Production of Conjugated Diene Polymer b

An autoclave was charged with 180 parts of ion-exchanged water, 2 parts of potassium oleate, 37 parts of acrylonitrile and 0.5 part of t-dodecylmercaptan (molecular weight modifier) in this turn. The inside atmosphere of the autoclave was replaced with nitrogen, and then 63 parts of butadiene was introduced. The autoclave was cooled to 5° C., and 0.1 part of p-menthane hydroperoxide (polymerization catalyst) and 0.05 part of ferrous sulfate were added. Then the autoclave was rotated for 16 hours to thoroughly stir the content while the autoclave was maintained at 5° C. Then an aqueous hydroquinone solution having a concentration of 10% was added into the autoclave to stop the polymerization. The polymerization conversion was 90%.

Unreacted monomers were removed, and then, the reaction mixture was poured into an aqueous solution containing 3 parts of aluminum sulfate 7 hydrate with stirring to precipitate a polymer crumb. The polymer crumb was taken out and poured into 1,000 parts of an aqueous potassium hydroxide solution having a pH value of 11.5. The mixture was stirred at 40° C. for 45 minutes whereby the polymer crumb was thoroughly contacted with the aqueous potassium hydroxide solution. The polymer crumb was taken and placed in 1,000 parts of water and the mixture was stirred for 10 minutes whereby the polymer crumb was washed with water. The polymer crumb was taken and dried for one day by a vacuum dryer.

The thus-obtained polymer b (butadiene-acrylonitrile copolymer) had a pH value of 9.3 as measured on a solution in tetrahydrofuran (THF). The pH value of copolymer b solution in THF was measured as follows. 6 g of the copolymer was dissolved in 100 g of THF; and 2 ml of distilled water was added to the polymer solution in THF while the polymer solution was stirred; and, when two minutes elapsed, the pH value was measured at room temperature by a pH measuring apparatus. The pH values of copolymers c and d explained below were also measured by the same method.

Reference Example 4

Production Of Conjugated Diene Polymer c

A reaction mixture was obtained by the same procedures as described in Reference Example 3. The reaction mixture was poured into an aqueous solution containing 3 parts of aluminum sulfate 7 hydrate with stirring. An aqueous potassium hydroxide solution was added to precipitate a polymer crumb while the pH value of the mixed liquid was maintained at 11.5. The crumb was taken out and poured into 1,000 parts of water, and the mixture was stirred for 10 minutes whereby the polymer crumb was washed with water. The polymer crumb was taken and dried for one day by a vacuum dryer. The thus-obtained polymer c exhibited a pH value of 9.0 as measured on a THF solution.

Comparative Reference Example 1

Production of Conjugated Diene Polymer d

A polymer d was obtained by the same procedures as described in Reference Example 3 except that the contact treatment of polymer crumb with an aqueous potassium hydroxide solution was not conducted. The polymer d exhibited a pH value of 7.0 as measured on a THF solution.

Example 25

Production of Hydrogenated Polymer

The polymer b produced in Reference Example 3 was dissolved in acetone to prepare a polymer solution having a concentration of 15%. An autoclave was charged with 60 parts of the polymer solution, and then 0.45 part of a hydrogenation catalyst (palladium catalyst supported on magnesium silicate; amount of palladium supported: 2%) was added. The inside atmosphere in the autoclave was replaced with nitrogen, and then replaced with hydrogen twice. Thereafter hydrogenation reaction was carried out at a hydrogen pressure of 5 MPa and a temperature of 50° C. for 6 hours. After completion of the hydrogenation reaction, a reaction liquid was concentrated under a reduced pressure by a rotary evaporator to give a hydrogenated butadiene-acrylonitrile polymer. The percentage hydrogenation of polymer as measured by proton NMR was 93.3%.

Example 26

Production of Hydrogenated Polymer

The procedures adopted in Example 25 were repeated to produce a hydrogenated butadiene-acrylonitrile copolymer wherein polymer c obtained in Comparative Reference Example 4 was used as a starting polymer with all other conditions remaining the same. The percentage hydrogenation of the hydrogenated polymer as measured by proton NMR was 91.2%.

Comparative Example 11

Production of Hydrogenated Polymer

The procedures adopted in Example 25 were repeated to produce a hydrogenated butadiene-acrylonitrile copolymer wherein polymer d obtained in Comparative Reference Example 1 was used as a starting polymer with all other conditions remaining the same. The percentage hydrogenation of the hydrogenated polymer as measured by proton NMR was 70.8%.

As seen from Reference Examples 3 and 4, Examples 25 and 26, Comparative Reference Example 1 and Comparative Example 11, the efficiency of hydrogenation varied greatly depending upon whether the treatment of contacting a polymer crumb with a basic compound (I.e., an aqueous basic solution) was conducted or not conducted in the process for producing the starting polymer. Starting polymers b and c, which had a pH value of larger than 7 as measured on a THF solution, exhibited enhanced efficiency for hydrogenation reaction as compared with starting polymer d having a pH value of 7.

Industrial Applicability

In the case when catalytic hydrogenation of a conjugated diene polymer is carried out in the presence of a basic compound in accordance with the present invention, the hydrogenation of conjugated diene polymer can be effected effectively and industrially advantageously with the use of a relatively small amount of a platinum group metal catalyst.

The catalyst system of the present invention for hydrogenation of a conjugated diene polymer, which comprises a combination of a platinum group metal or its compound with a basic compound, exhibits a high activity for hydrogenation as compared with the conventional hydrogenation catalysts. Especially the catalyst system for hydrogenation comprising a combination of a platinum group metal compound of a non-reduced state with a basic compound is beneficial in that a complicated reducing treatment can be dispensed at the step of preparing the catalyst, and the catalyst system exhibits a high activity for hydrogenation. In the case when the conjugated diene polymer composition of the present invention, which comprises a basic compound and has a pH value of larger than 7 as measured on a solution in tetrahydrofuran, is used as a starting polymer, the hydrogenation reaction proceeds at a very high rate and the hydrogenated polymer can be produced with high efficiency.

The hydrogenated conjugated diene polymer has good weather resistance, heat stability, cold resistance and other properties, and can be used in a broad field of industrial application.

The invention claimed is:

1. A process for hydrogenating a conjugated diene copolymer comprising conjugated diene units and α,β-ethylenically unsaturated nitrile units, characterized in that a conjugated diene copolymer comprising conjugated diene units and α,β-ethylenically unsaturated nitrile units is hydrogenated in a state of latex in the presence of a catalyst comprising a platinum group metal or a compound thereof and a basic compound wherein:
    (a) the catalyst is a supported catalyst which is prepared from a mixed liquid having a pH value of 7.2 to 13 and comprising the catalyst and a basic carrier, said basic carrier being selected from the group consisting of magnesium hydroxide, calcium hydroxide, barium hydroxide, basic aluminum hydroxide, magnesium oxide, yttrium oxide, magnesium silicate, calcium silicate, and sodium aluminate; or
    (b) the catalyst is a homogeneous catalyst and the basic compound is at least one compound selected from the group consisting of alkali metal hydroxides, alkali metal carbonate salts, alkali metal hydrogencarbonate salts, alkaline earth metal hydroxides, alkaline earth metal carbonate salts, and alkaline earth metal hydrogencarbonate salts.

2. The hydrogenation process according to claim 1, wherein the conjugated diene copolymer comprises 10 to 90% by weight of conjugated diene units and 90 to 10% by weight of α,β-ethylenically unsaturated nitrile units.

3. A process for hydrogenating a conjugated diene copolymer comprising conjugated diene units and α,β-ethylenically unsaturated nitrile units, characterized in that a conjugated diene copolymer comprising conjugated diene units and α,β-ethylenically unsaturated nitrile units is hydrogenated in the presence of a catalyst comprising a platinum group metal or a compound thereof and a basic compound wherein:
    (a) the catalyst is a supported catalyst which is prepared from a mixed liquid having a pH value of 7.2 to 13 and comprising the catalyst and a basic carrier, said basic carrier being selected from the group consisting of magnesium hydroxide, calcium hydroxide, barium hydroxide, basic aluminum hydroxide, magnesium oxide, yttrium oxide, magnesium silicate, calcium silicate, and sodium aluminate; or
    (b) the catalyst is a homogeneous catalyst and the basic compound is at least one compound selected from the group consisting of alkali metal hydroxides, alkali metal carbonate salts, alkali metal hydrogencarbonate salts, alkaline earth metal hydroxides, alkaline earth metal carbonate salts, and alkaline earth metal hydrogencarbonate salts,
    wherein the conjugated diene copolymer is hydrogenated by the steps of
    preparing a reaction system by incorporating the catalyst in a solution of a composition comprising the conjugated diene copolymer and the basic compound, and then
    carrying out hydrogenation of the conjugated diene copolymer in the reaction system.

4. The hydrogenation process according to claim 3 wherein the composition comprising the conjugated diene copolymer and the basic compound is prepared by contacting a crumb obtained by coagulating a conjugated diene copolymer as produced in a polymerization step, with an aqueous solution of the basic compound.

5. The hydrogenation process according to claim 1 wherein the catalyst comprises a compound of platinum group metal in a non-reduced state.

6. The hydrogenation process according to claim 3, wherein the conjugated diene copolymer comprises 10 to 90% by weight of conjugated diene units and 90 to 10% by weight of α,β-ethylenically unsaturated nitrile units.

7. The hydrogenation process according to claim 3, wherein the catalyst comprises a compound of platinum group metal in a non-reduced state.

* * * * *